United States Patent
Mitts et al.

(10) Patent No.: US 9,174,575 B2
(45) Date of Patent: Nov. 3, 2015

(54) DRIVER PROMPTING BRAKING SYSTEM AND METHOD

(71) Applicant: FORD GLOBAL TECHNOLOGIES, LLC, Dearborn, MI (US)

(72) Inventors: Kurt Mitts, Scotts, MI (US); Aaron L. Mills, Ann Arbor, MI (US); Dale Scott Crombez, Livonia, MI (US); Daniel A. Gabor, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 14/035,434

(22) Filed: Sep. 24, 2013

(65) Prior Publication Data

US 2015/0084758 A1   Mar. 26, 2015

(51) Int. Cl.
*B60Q 1/00* (2006.01)
*B60Q 9/00* (2006.01)
*B60Q 5/00* (2006.01)

(52) U.S. Cl.
CPC ............... *B60Q 9/008* (2013.01); *B60Q 5/006* (2013.01)

(58) Field of Classification Search
CPC ......... G08G 1/16; G08G 1/163; G08G 1/164; G08G 1/166; G08G 1/096791; G08G 1/165; G08G 1/167; G08G 1/168; G08G 1/0112; G08G 1/0129; G08G 1/0145; G08G 1/095; G08G 1/096716; G08G 1/096725; G08G 1/00
USPC .............. 340/438, 439, 444, 463, 450.1, 452, 340/460, 464, 466, 477, 479, 539.21, 340/539.22, 539.23
See application file for complete search history.

(56) References Cited

U.S. PATENT DOCUMENTS

| | | | |
|---|---|---|---|
| 5,522,637 A * | 6/1996 | Spears | 296/180.3 |
| 7,018,004 B2 * | 3/2006 | Chen et al. | 303/193 |
| 2002/0026273 A1 * | 2/2002 | Tamura et al. | 701/70 |
| 2009/0299578 A1 * | 12/2009 | Lucas et al. | 701/46 |
| 2009/0326753 A1 | 12/2009 | Chen et al. | |
| 2010/0030458 A1 * | 2/2010 | Coughlin | 701/123 |
| 2011/0153178 A1 * | 6/2011 | Westendorf | 701/96 |
| 2012/0025969 A1 * | 2/2012 | Dozza | 340/463 |
| 2012/0226433 A1 * | 9/2012 | Hasan et al. | 701/112 |
| 2012/0283939 A1 * | 11/2012 | Bobbitt, III | 701/123 |

FOREIGN PATENT DOCUMENTS

WO   WO 2013012378 A1   1/2013

OTHER PUBLICATIONS

Final Report on the Fuel Saving Effectiveness of Various Driver Feedback Approaches, Mar. 1, 2011, by Jeffrey Gonder, Matthew Earleywine, and Witt Sparks http://www.nrel.gov/vehiclesandfuels/vsa/pdfs/50836.pdf.

* cited by examiner

*Primary Examiner* — Daniel Previl
(74) *Attorney, Agent, or Firm* — David Kelley, Esq.; Tung & Associates

(57) ABSTRACT

A driver prompting braking system includes a detection device adapted to sense at least one object in front of the vehicle; a detection system interfacing with the detection device, the detection system adapted to detect the at least one object; and a brake coaching system interfacing with the detection system, the brake coaching system adapted to determine a brake application timing for an operator of the vehicle to avoid the object and optimize fuel economy of the vehicle. A driver prompting braking method is also disclosed.

20 Claims, 3 Drawing Sheets

DRIVER PROMPTING BRAKING SYSTEM AND METHOD

FIELD

Illustrative embodiments of the disclosure relate to vehicle braking. More particularly, illustrative embodiments of the disclosure relate to a driver prompting braking system and method which prompts a driver of a vehicle as to the optimal time for brake application in slowing or stopping of the vehicle to enhance vehicle economy.

BACKGROUND

Operators of motor vehicles may compromise fuel economy due to later-than-optimal braking in the slowing or stopping of the vehicles. Earlier onset and gradual application of vehicle brakes may improve vehicle fuel economy or energy capture in the case of vehicles with regenerative braking capabilities.

Accordingly, a driver prompting braking system and method which prompts a driver of a vehicle as to the optimal time for brake application in slowing or stopping of the vehicle to enhance vehicle economy may be desirable.

SUMMARY

Illustrative embodiments of the disclosure are generally directed to a driver prompting braking system which prompts a driver of a vehicle as to the optimal time for brake application in slowing or stopping of the vehicle to enhance vehicle economy. An illustrative embodiment of the system includes a detection device adapted to sense at least one object in front of the vehicle; a detection system interfacing with the detection device, the detection system adapted to detect the at least one object; and a brake coaching system interfacing with the detection system, the brake coaching system adapted to determine a brake application timing for an operator of the vehicle to avoid the object and optimize fuel economy of the vehicle.

Illustrative embodiments of the disclosure are further generally directed to a driver prompting braking method. An illustrative embodiment of the method includes calculating a required deceleration required for a vehicle to avoid an object, comparing the required deceleration to a deceleration threshold value and indicating an optimal brake application timing to an operator of the vehicle if the required deceleration exceeds the deceleration threshold value.

BRIEF DESCRIPTION OF THE DRAWINGS

Illustrative embodiments will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
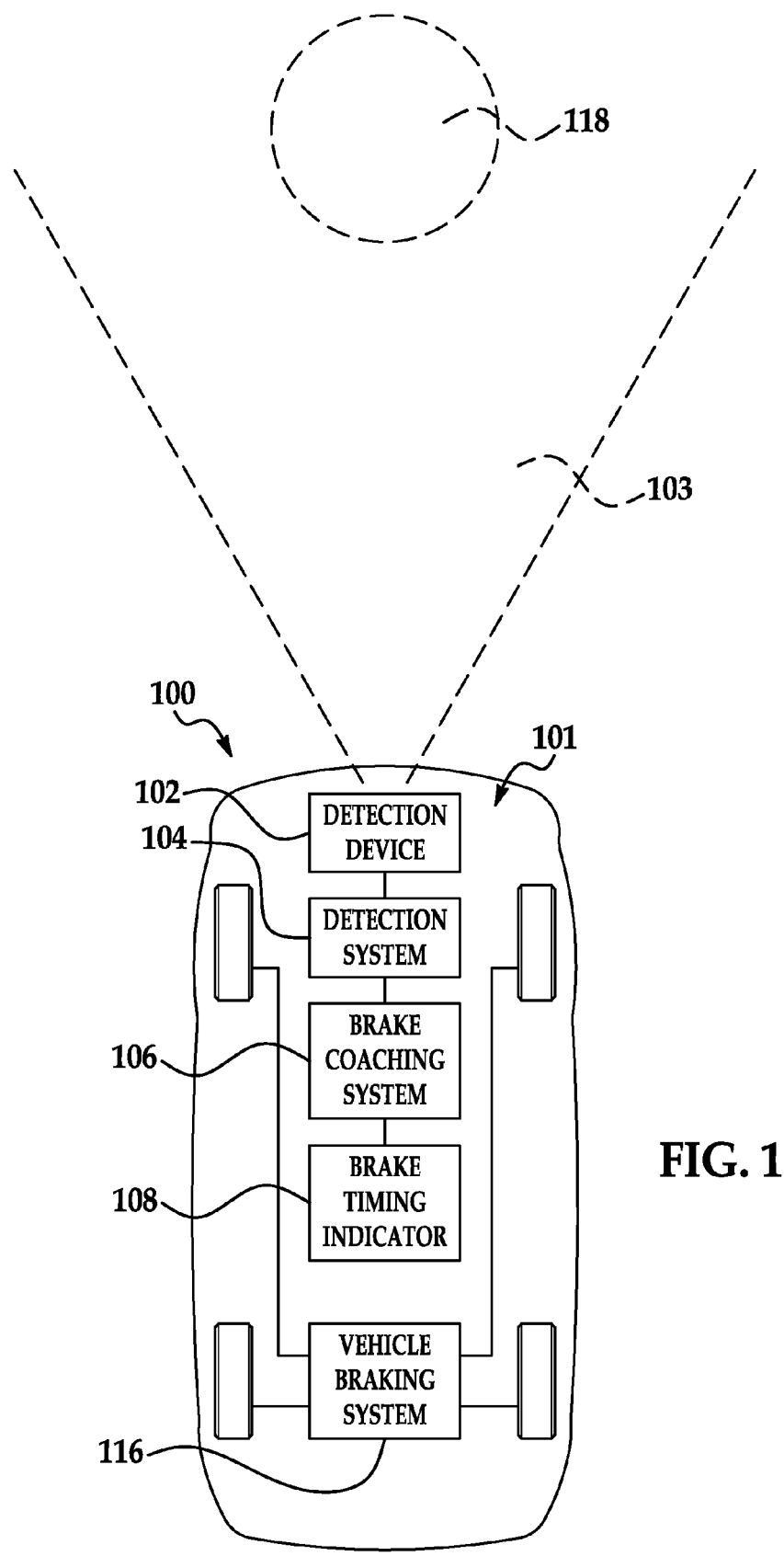
FIG. 1 is a block diagram which illustrates a vehicle equipped with an illustrative embodiment of the driver prompting braking system in exemplary implementation of the driver prompting braking method.

Referring initially to FIG. 1, a vehicle 100 equipped with an illustrative embodiment of the driver prompting braking system 101 in implementation of the driver prompting braking method is shown. The system 101 may include a detection device 102 which faces forwardly from the vehicle 100. In some embodiments, the detection device 102 may include a camera. In some other embodiments, the detection device 102 may include a radar, a lidar, or Vehicle-To-Vehicle (V2V) or Vehicle-To-Infrastructure (V21) communications. A detection system 104 may interface with the camera 102. The detection system 104 may be adapted to detect at least one object 118 which lies within the viewing field 103 of the camera 102 in front of the vehicle 100 and which the vehicle 100 approaches.

A brake coaching system 106 may interface with the detection system 104. A brake timing indicator 108 may interface with the brake coaching system 106. The brake coaching system 106 may be adapted to calculate the deceleration which is required for the vehicle 100 to avoid the object 118 in front of the vehicle 100 as the vehicle 100 approaches the object 118. The brake coaching system 106 may use the speed of the vehicle 100 and the distance between the vehicle 100 and the object 118 to calculate the required deceleration.

The brake coaching system 106 may additionally be adapted to electronically store a predetermined deceleration threshold value and compare the required deceleration threshold to the predetermined deceleration threshold value. In the event that the required deceleration exceeds the deceleration threshold value, the brake coaching system 106 may be adapted to transmit a signal to the brake timing indicator 108. The brake timing indicator 108 may be adapted to indicate the optimal brake application timing to the vehicle operator such that the vehicle operator will apply the vehicle brakes in a timely manner to avoid the object 118 and optimize fuel economy of the vehicle 100, as will be hereinafter described.

Figure 2:
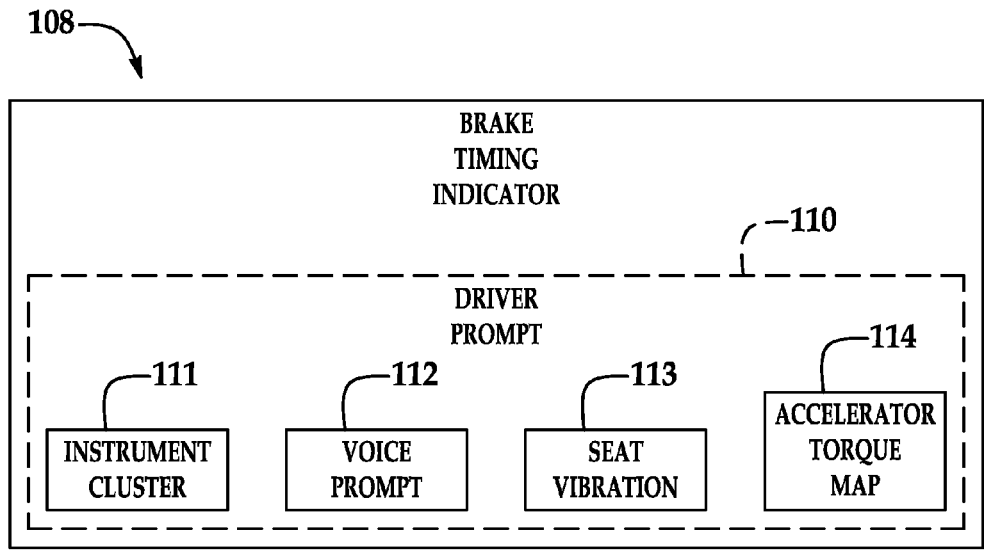
FIG. 2 is a block diagram of an exemplary brake timing indicator.

As shown in FIG. 2, in some embodiments, the brake timing indicator 108 of the system 101 may include at least one driver prompt 110. The driver prompt 110 may communicate the optimal brake timing to the vehicle operator visually through an instrument cluster 111, audibly through a voice prompt 112 and/or through operator seat vibration 113. In some embodiments, the driver prompt 110 may communicate the optimal brake timing to the vehicle operator visually through a Head-Up Display. In some embodiments, the brake timing indicator 108 may change the accelerator torque map 114 at the optimal brake application timing such that the accelerator torque is less responsive than normal and may further coach the vehicle operator on the most fuel efficient driving behavior. In some embodiments, the driver prompt braking system 101 may be configured to be passive, in which the system 101 may use the information at the optimal brake application timing and further refine the brake coach score on a hybrid electric vehicle (HEV) 100.

In exemplary application of the system 101, the camera 102 sights an object 118 in the path of the vehicle 100. The object 118 may be a slowing or stopped vehicle, a bicycle or other object or a red light or stop sign which is in or near the path of the vehicle 100 and the vehicle operator must slow or stop the vehicle 100 to avoid the object 118. The detection system 101 detects the object 118 and the brake coaching system 116 calculates the deceleration required to slow or stop the vehicle 100 and avoid the object 118. The brake coaching system 116 compares the required deceleration to the predetermined threshold deceleration value. In the event that the required deceleration exceeds the threshold deceleration value, the brake timing indicator 108 communicates the optimal brake application timing to the vehicle operator via the instrument cluster 111 (FIG. 2), the voice prompt 112 and/or the seat vibration 113. In some embodiments, the brake coaching system 106 may change the accelerator torque map 114 at the optimal brake application timing to be less responsive than normal and may further coach the vehicle operator on the most fuel efficient driving behavior. In some embodiments, the driver prompt braking system 101 may be passive, in which the system 101 may use the information at the optimal brake application timing and further refine the brake coach score on a hybrid electric vehicle (HEV) 100.

Figure 4:
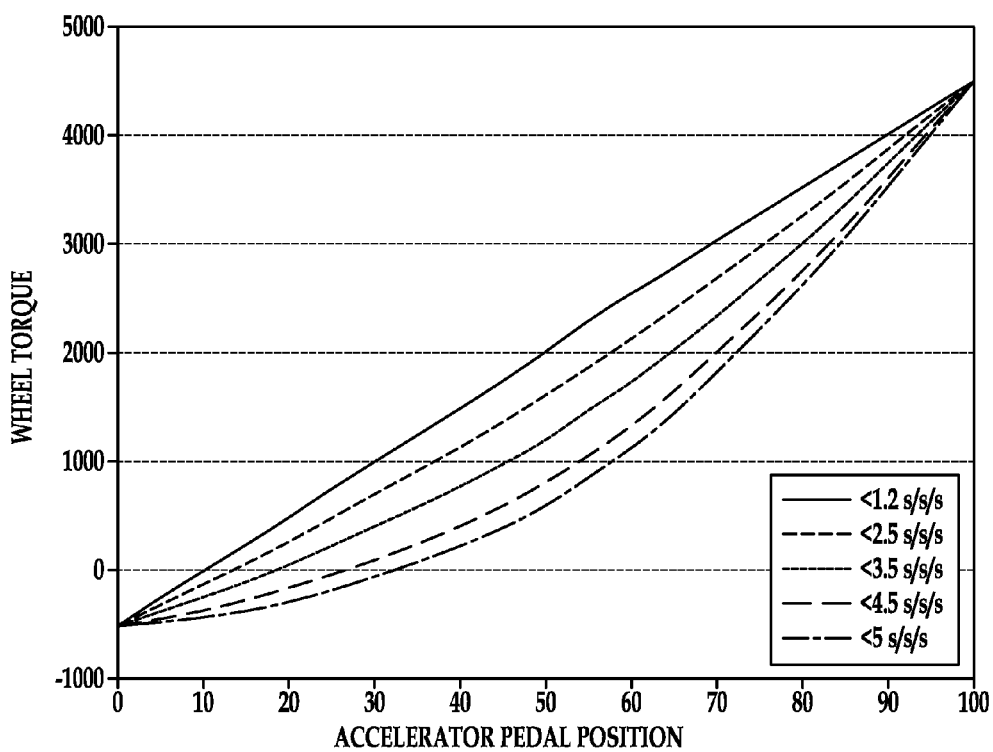
FIG. 4 is a line graph which illustrates an accelerator torque map in implementation of an illustrative embodiment of the driver prompting braking method.
Figure 3:
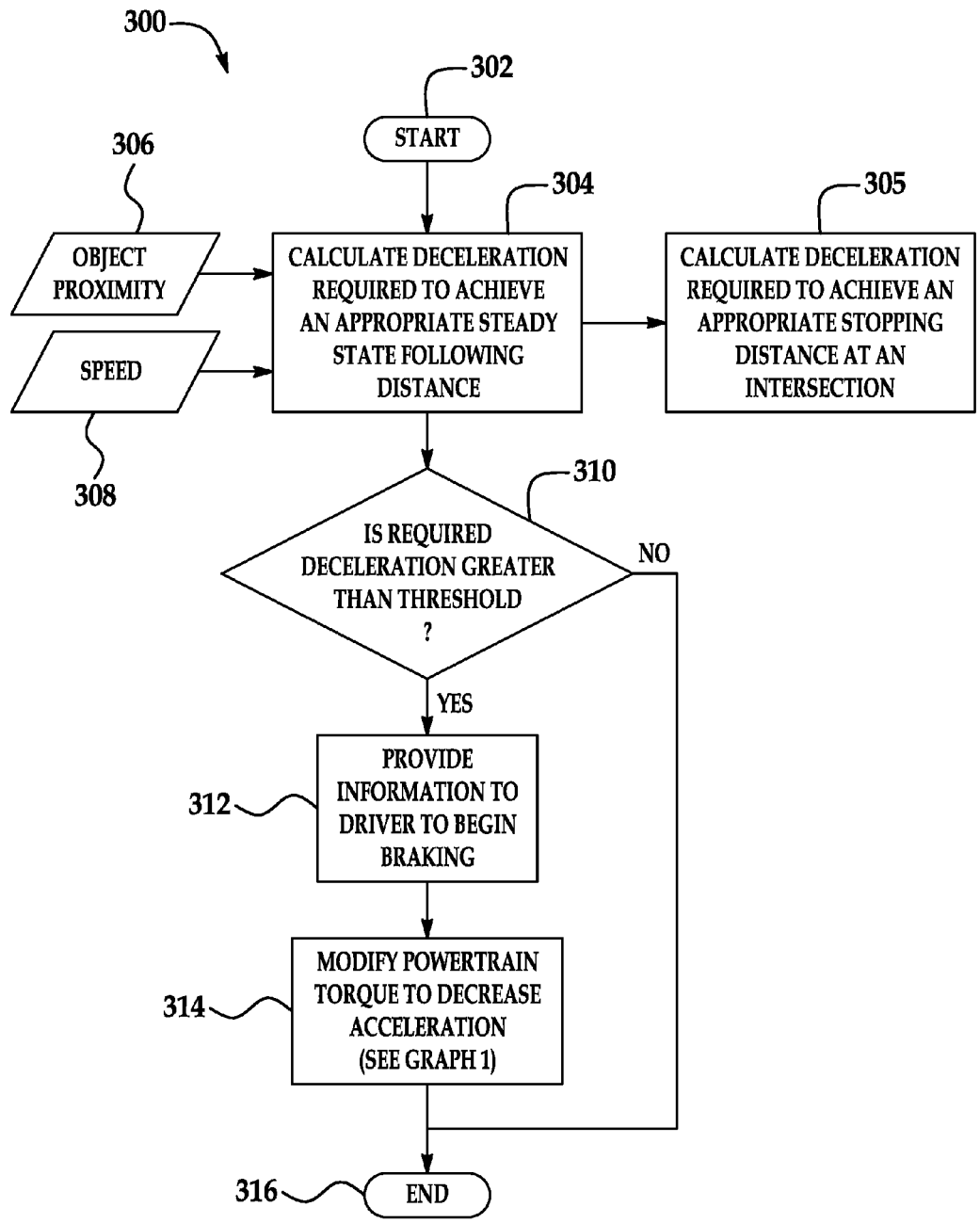
FIG. 3 is a flow diagram of an illustrative embodiment of the driver prompting braking method.

Referring next to FIG. 3, a flow diagram 300 of an illustrative embodiment of the driver prompting braking method is shown. In FIG. 4, a line graph which illustrates an accelerator torque map in implementation of an illustrative embodiment of the driver prompting braking method is shown. The method begins at block 302 of FIG. 3. In block 304, deceleration which is required to achieve an appropriate steady state following distance may be calculated. The calculation may be based on the proximity of the vehicle to the object (block 306) and the speed of the vehicle (block 308). In some embodiments, the calculation in block 304 may include calculation of deceleration which is required to achieve an appropriate stopping distance at an intersection in block 305 such as to avoid a slowing or stopped vehicle, a bicycle or other object or a red light or stop sign which is in or near the path of the vehicle. In block 310, a determination may be made as to whether the required deceleration which was calculated in block 304 is greater than a predetermined deceleration threshold value. If the required deceleration is greater than the deceleration threshold value, then information may be provided to the operator of the vehicle to enable the vehicle operator to begin braking at the optimal brake application timing (block 312). If the required deceleration is not greater than the deceleration threshold value, the method may end at block 316. In block 314, in some embodiments, the powertrain torque of the vehicle may be modified to decrease acceleration, as shown in the graph in FIG. 4. The method may end at block 316.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A driver prompting braking system for a vehicle, comprising:
    a detection device configured to sense at least one object in front of the vehicle;
    a detection system interfacing with the detection device, the detection system configured to detect the at least one object; and
    a brake coaching system interfacing with the detection system, the brake coaching system configured to determine a brake application timing for an operator of the vehicle to avoid the object and optimize fuel economy of the vehicle, the brake coaching system configured to indicate the brake application timing to an operator of the vehicle if a required deceleration value exceeds a deceleration threshold value, the required deceleration including stopping and deceleration needed to obtain a steady state following distance from the object.

2. The system of claim 1 further comprising a brake timing indicator interfacing with the brake coaching system, the brake timing indicator configured to indicate the brake application timing to the vehicle operator.

3. The system of claim 2 wherein the brake timing indicator is configured to communicate a driver prompt to the vehicle operator.

4. The system of claim 3 wherein the driver prompt is communicated via an instrument cluster.

5. The system of claim 3 wherein the driver prompt is communicated via a voice prompt.

6. The system of claim 3 wherein the driver prompt is communicated via an operator seat vibration.

7. The system of claim 1 wherein the driver prompt is communicated via any combination of an instrument cluster, a voice prompt and an operator seat vibration.

8. The system of claim 1 wherein the brake coaching system is configured to reduce an accelerator torque of the vehicle at the brake application timing.

9. A driver prompting braking system for a vehicle, comprising:
    a detection device configured to sense at least one object in front of the vehicle;
    a detection system interfacing with the detection device, the detection system configured to detect the at least one object; and
    a brake coaching system interfacing with the detection system, the brake coaching system configured to determine a brake application timing for an operator of the vehicle to avoid the object and optimize fuel economy of the vehicle by:
        calculating a required deceleration required to avoid the object, the required deceleration including stopping and deceleration needed to obtain a steady state following distance from the object,
        determining whether the required deceleration is greater than a predetermined deceleration threshold value, and
        communicating the brake application timing to the operator of the vehicle if the required deceleration is greater than the deceleration threshold value.

10. The system of claim 9 further comprising a brake timing indicator interfacing with the brake coaching system, the brake timing indicator configured to indicate the brake application timing to the vehicle operator.

11. The system of claim 10 wherein the brake timing indicator is configured to communicate a driver prompt to the vehicle operator.

12. The system of claim 11 wherein the driver prompt is communicated via an instrument cluster.

13. The system of claim 11 wherein the driver prompt is communicated via a voice prompt.

14. The system of claim 11 wherein the driver prompt is communicated via an operator seat vibration.

15. The system of claim 9 wherein the driver prompt is communicated via any combination of an instrument cluster, a voice prompt and an operator seat vibration.

16. The system of claim 9 wherein the brake coaching system is configured to reduce an accelerator torque of the vehicle at the brake application timing.

17. A driver prompting braking method, comprising:
calculating a required deceleration required for a vehicle to avoid an object, the required deceleration including stopping and deceleration needed to obtain a steady state following distance from the object;
comparing the required deceleration to a deceleration threshold value; and
indicating an optimal brake application timing to an operator of the vehicle if the required deceleration exceeds the deceleration threshold value.

18. The method of claim 17 wherein indicating an optimal brake application timing to an operator of the vehicle comprises communicating a driver prompt to the operator of the vehicle via any combination of an instrument cluster, a voice prompt and an operator seat vibration.

19. The method of claim 17 further comprising decreasing acceleration of the vehicle by modifying powertrain torque.

20. The method of claim 17 wherein calculating a required deceleration required for a vehicle to avoid an object comprises calculating a required deceleration required for a vehicle to avoid an object using vehicle speed and proximity of the vehicle to the object.

\* \* \* \* \*